United States Patent
Nellis et al.

[15] 3,638,910
[45] Feb. 1, 1972

[54] CAR WHEEL SUPPORT

[72] Inventors: Guy I. Nellis; Eugene E. Wiesenhofer, both of Phoenix, Ariz.

[73] Assignee: said Nellis, by said Wiesenhofer

[22] Filed: June 1, 1970

[21] Appl. No.: 41,990

[52] U.S. Cl. .................. 254/88, 248/188, 248/165, 248/352, 193/41
[51] Int. Cl. ..................................................... B66f 19/00
[58] Field of Search .............. 248/352; 193/41; 254/5 B, 45, 254/50, 88

[56] References Cited
UNITED STATES PATENTS

| 1,855,949 | 4/1932 | Dubroca | 254/88 |
| 2,272,334 | 2/1942 | Laurent | 254/88 |
| 3,386,703 | 6/1968 | Thumma | 254/88 |

FOREIGN PATENTS OR APPLICATIONS

| 548,509 | 11/1957 | Canada | 193/41 |

Primary Examiner—William H. Schultz
Attorney—Warren F. B. Lindsley

[57] ABSTRACT

A compact telescopic lightweight car wheel support.

4 Claims, 7 Drawing Figures

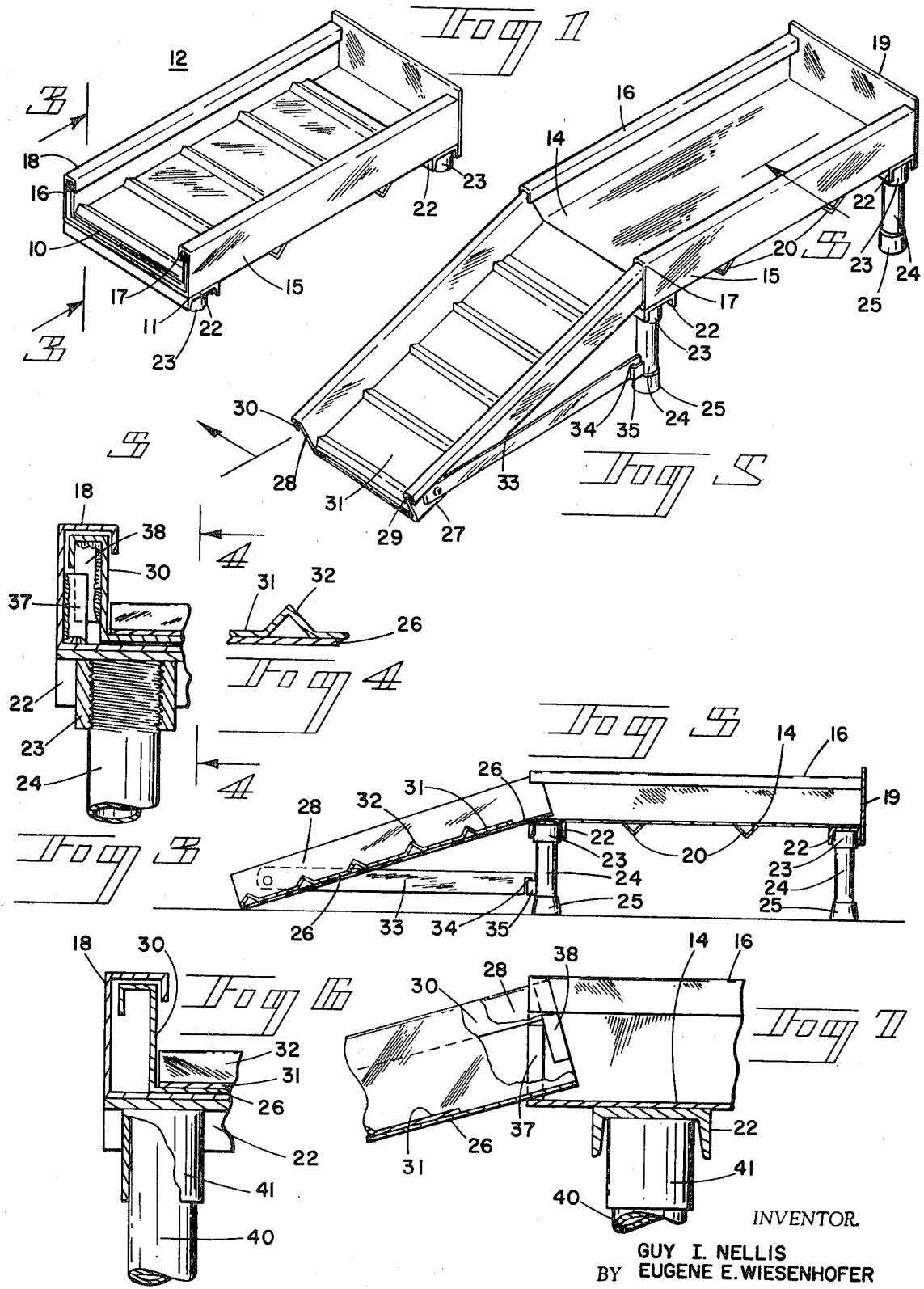

CAR WHEEL SUPPORT

BACKGROUND OF THE INVENTION

This invention relates to means for supporting the wheels of a car so as to elevate the car for inspection and repair purposes.

1. Field of the Invention

This invention is particularly directed to car wheel supports which eliminate the safety hazards involved in the use of gear and hydraulic jacks. These jacks elevate the body of the car causing one or more wheels to be lifted from the ground support and are always subject to being upset through movement of the body of the car.

2. Description of the Prior Art

At the present time jacks are used for raising heavy bodies such as automobiles (cars) by means of simple screw moving a nut fixed in the shell of the instrument and turned by a long handle. Hydraulic jacks have also been used since they are compact in size, simple in design and embody the desired combination of strength and lightness in construction.

In each instance the jacks are used to lift the frame of the car, and regardless of the strength of construction of the jack, the danger in use is the unstable condition of the body of the car when elevated in this manner.

SUMMARY OF THE INVENTION

In accordance with the invention claimed an improved car wheel support is provided which supports the body of the car through its wheels. Each car wheel support comprises a ramp for guiding the wheel of the car to its elevated position wherein the wheel is supported by a platform mounted on four sturdy legs. In one of the embodiments disclosed the legs of the platform are adjustable for aiding in leveling the platform for stability purposes.

The improved car wheel support is arranged so that it may be telescoped together for easily moving it from one site to another or storing for later use.

It is, therefore, one object of this invention to provide an improved car wheel support.

Another object of this invention is to provide an improved car wheel support which telescopes together for easy handling.

A further object of this invention is to provide a car wheel support upon which the car is driven by an operator.

A still further object of this invention is to provide a car wheel support in which its ramp is locked in a given extended position and adapted to easily telescope into a platform portion of the support when not in use.

Further objects and advantages of the invention will become apparent as the following description proceeds and the features of novelty which characterizes this invention will be pointed out with particularity in the claims annexed to and forming part of the specification.

BRIEF DESCRIPTION OF THE DRAWING

FIG. 1 is a perspective view of the car wheel support in its collapsed position and embodying the invention;

FIG. 2 is a perspective view of the car wheel support shown in FIG. 1 in its extended useable position;

FIG. 3 is an enlarged cross-sectional view of FIG. 1 taken along the line 3—3;

FIG. 4 is a cross-sectional view of FIG. 3 taken along the line 4—4;

FIG. 5 is a cross-sectional view of FIG. 2 taken along the line 5—5;

FIG. 6 is a cross-sectional view of a modification of the car wheel support in its compact position showing a slip fit of the platform leg; and FIG. 7 is a cross-sectional view of the modification of the car wheel support shown in FIG. 6 in its extended position.

DESCRIPTION OF PREFERRED EMBODIMENT

Referring more particularly to the drawing by characters of reference, FIG. 1 discloses the ramp 10 in its telescoped position inside the platform 11 of the car wheel support 12.

The platform comprises a bottom 14, a pair of sides 15 and 16 each having turned-in flanges forming inverted U-shaped members 17 and 18, respectively, along their upper edges and an end 19. Cross support angle irons 20 are attached to the bottom and used to add rigidity to the bottom of the platform.

Across the underside of each end of the platform is welded a U-shaped channel member 22 for further supporting the bottom 14 of the car wheel support 12 and also serves as a means for mounting an internal threaded cap 23 one at each corner of the platform for receiving the legs.

As shown in FIG. 3 a leg member 24 is threadly mounted in each cap 23 for supporting the platform 11 a given distance off of its ground or flooring support. Each leg may be provided at its free end with a rubber or plastic shoe 25 which protects the surface on which the platform is mounted from being scratched.

It should be noted that each leg may be individually adjusted by turning the leg further into cap 23 or by backing off on the threaded connection.

The ramp 10 comprises a bottom 26, sides 27 and 28 each having turned-out flanges forming inverted U-shaped members 29 and 30, respectively, along their upper edges. Although not necessary, a second bottom surface 31 defining laterally spaced protrusions 32 in the form of inverted right angles are spaced along the length of the ramp. These inverted right angles provide the car tire a gripping surface when mounting the platform.

As shown in FIGS. 2 and 5 support arms 33 are pivotally mounted adjacent the free end of the ramp. Each arm is provided with a hook end 34, the hook of which engages a catch 35 provided on the base of each leg.

In order to keep the ramp from being pulled completely out of its telescope arrangement with platform 11, catches 37 and 38 are fastened to the ends of U-shaped edges 17 and 18 (FIGS. 3 and 7) and U-shaped edges 29 and 30. Thus, when the ramp is in its most extended position the catches 37 and 38 are in abutting engagement.

FIGS. 6 and 7 illustrate a modification of the structure shown in FIGS. 1–5 wherein the only difference is that the legs 40 are arranged to fit snugly into unthreaded caps 41.

Although but two embodiments of the present invention have been illustrated and described, it will be apparent to those skilled in the art that various changes and modifications may be made therein without departing from the spirit of the invention or from the scope of the appended claims.

What is claimed is:

1. A car wheel support comprising in combination:
  a leg-mounted platform, said platform comprising a bottom, a pair of sides, each of said sides being provided with an inturned flange defining U-shaped edges, an open end, and a closed end,
  a ramp telescopically arranged with said open end of said platform, said ramp being provided with a pair of sides, each of said sides being provided with outwardly turned flanges defining U-shaped edges, said edges of said ramp being in telescopic arrangement with said edges of said platform, said ramp being movable into said platform in its compact position,
  a pair of support arms pivotally mounted one on each side on the free end of said ramp, a catch at the end of each support arm, and means for connecting said catch of each arm to said platform for locking said ramp in its extended position, and
  stop means mounted one on the free end of each of said sides of said platform and on the inner ends of said ramp for abutting each other to limit the outward movement of said ramp away from said platform and to provide pivotal movement of said ramp relative to said platform to cause the free end of said ramp to engage the ground.

2. The combination set forth in claim 1 wherein the legs of said support are detachably connected to said bottom of said platform.

3. The combination set forth in claim 1 wherein the legs are each threadly connected to said bottom of said platform for leveling said support prior to use.

4. The combination set forth in claim 1 wherein said legs are in frictional engagement with caps supported by said bottom for ease of assembly.

* * * * *